United States Patent
Amirsolaimani et al.

(10) Patent No.: US 12,169,273 B2
(45) Date of Patent: Dec. 17, 2024

(54) TUNABLE LENS WITH DEFORMABLE REFLECTOR

(71) Applicant: Facebook Technologies, LLC, Menlo Park, CA (US)

(72) Inventors: Babak Amirsolaimani, Redmond, WA (US); Yusufu Njoni Bamaxam Sulai, Snohomish, WA (US); Kieran Connor Kelly, Seattle, WA (US); Spencer Allan Wells, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 634 days.

(21) Appl. No.: 17/411,647

(22) Filed: Aug. 25, 2021

(65) Prior Publication Data
US 2023/0041406 A1    Feb. 9, 2023

Related U.S. Application Data
(60) Provisional application No. 63/230,344, filed on Aug. 6, 2021.

(51) Int. Cl.
| | |
|---|---|
| *G02B 26/00* | (2006.01) |
| *G02B 17/08* | (2006.01) |
| *G02B 26/08* | (2006.01) |
| *G02B 27/01* | (2006.01) |
| *G02B 27/28* | (2006.01) |
| *G02C 7/08* | (2006.01) |

(52) U.S. Cl.
CPC ......... *G02B 26/0825* (2013.01); *G02B 17/08* (2013.01); *G02B 27/0172* (2013.01); *G02B 27/286* (2013.01); *G02C 7/081* (2013.01); *G02B 2027/0178* (2013.01)

(58) Field of Classification Search
CPC ................ G02B 26/0825; G02B 17/08; G02B 27/0172; G02B 27/286; G02B 2027/0178; G02B 26/004; G02B 26/005; G02B 26/007; G02B 26/0866; G02C 7/081; G02C 7/086
USPC ...................................................... 359/224.1
See application file for complete search history.

(56) References Cited

U.S. PATENT DOCUMENTS

| | | | |
|---|---|---|---|
| 10,895,737 B1 | 1/2021 | Wells et al. | |
| 11,550,151 B2 * | 1/2023 | Marin | ...................... G06F 3/013 |
| 2017/0358136 A1 * | 12/2017 | Gollier | .................... G06F 3/013 |

OTHER PUBLICATIONS

International Search Report and Written Opinion for International Application No. PCT/US2022/039657, mailed Nov. 7, 2022, 9 pages.
International Preliminary Report on Patentability for International Application No. PCT/US2022/039657, mailed Feb. 15, 2024, 8 pages.

* cited by examiner

*Primary Examiner* — Henry Duong
(74) *Attorney, Agent, or Firm* — Greenberg Traurig, LLP

(57) ABSTRACT

A varifocal ocular lens is disclosed. The varifocal ocular lens is based on a pancake lens having a polarization-folded optical path formed by two reflectors, e.g. one polarization-selective reflector and one partial reflector. By placing at least one of the reflectors onto a flexible deformable membrane, the shape e.g. radius of curvature and/or cylindricity of the reflector(s) may be dynamically changed to vary focal length and/or astigmatism of the ocular lens. Viewer's visual prescription and eye vergence may be dynamically and/or statically accommodated by the varifocal lens.

20 Claims, 8 Drawing Sheets

TUNABLE LENS WITH DEFORMABLE REFLECTOR

REFERENCE TO RELATED APPLICATIONS

This application claims priority from a U.S. Provisional Patent Application No. 63/230,344, filed on Aug. 6, 2021, entitled "Tunable Lens with Deformable Reflector", and incorporated herein by reference in its entirety.

TECHNICAL FIELD

The present disclosure relates to optical devices, and in particular to tunable optical elements, and visual display devices using such tunable optical elements.

BACKGROUND

Visual displays are used to provide information to viewer(s) including still images, video, data, etc. Visual displays have applications in diverse fields including entertainment, education, engineering, science, professional training, advertising, to name just a few examples. Some visual displays, such as TV sets, display images to several users, and some visual display systems are intended for individual users. Visual displays are viewed either directly, or by means of special glasses that may include optical shutters, as well as special varifocal lenses.

An artificial reality system generally includes a near-eye display (e.g., a headset or a pair of glasses) configured to present content to a user. A near-eye display may display virtual objects or combine images of real objects with virtual objects, as in virtual reality (VR), augmented reality (AR), or mixed reality (MR) applications. For example, in an AR system, a user may view images of virtual objects (e.g., computer-generated images (CGIs)) superimposed onto surrounding environment. In some near-eye displays, each eye of the user views an image displayed on a miniature display panel. The image may be observed through an ocular lens.

Compact and efficient display systems are desired for head-mounted displays. Because a display of HMD or NED is usually worn on the head of a user, a large, bulky, unbalanced, and/or heavy display device would be cumbersome and may be uncomfortable for the user to wear. Compact display devices require compact and efficient light sources, shutters, display panels, ocular lenses, and so on.

BRIEF DESCRIPTION OF THE DRAWINGS

Exemplary embodiments will now be described in conjunction with the drawings, in which.

DETAILED DESCRIPTION

Figure 1A:
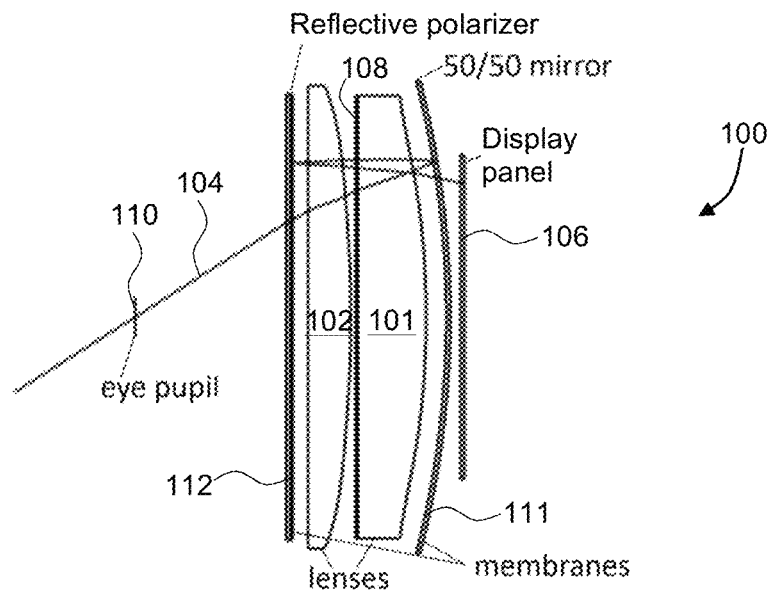
FIG. 1A is a side cross-sectional view of a tunable lens of this disclosure.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

Presenting simulated or augmented scenery to a user of a near-eye display can cause visual fatigue and nausea resulting from a limited capability of existing headsets to properly compensate for a discrepancy between eye vergence and eye focusing to accommodate a visual distance, a problem known as vergence-accommodation conflict. The vergence-accommodation conflict appears as a result of changing vergence of eyes of a user depending on what virtual object the user is looking at, while the accommodation (i.e. focusing) of the eyes is generally fixed and set by the distances between electronic display generating virtual images and a lens system projecting the images into user's eyes.

One solution to the problem of vergence-accommodation conflict in near-eye display systems based on miniature display panels viewed via ocular lenses is to move the display panels back and forth in accordance with the vergence angle of the objects displayed by the display panels. Physical movement of the display panels poses speed and reliability problems. Another solution is to make ocular lenses varifocal, like an eye lens itself, i.e. tune or change the optical power (i.e. focusing or defocusing power) of the ocular lenses dynamically to accommodate the change in eye vergence.

A solution described herein provides a compact varifocal lens capable not only of changing optical power, but also optionally accommodating eye prescription requirements of a potential user, such as astigmatism, for example. A varifocal lens of this disclosure may be based on a so-called pancake lens including refractive and reflective optical elements in an optical path folded by polarization. A pancake lens may include two reflectors, one polarization-selective reflector and one partial reflector. By placing at least one of these reflectors onto a flexible deformable membrane, the shape of the reflector may be dynamically changed as needed. For example, the shape may be changed to include a variable spherical or parabolic component to change the focus, and a cylindrical component to change the astigmatism. Various other shapes may also be envisioned.

In accordance with the present disclosure, there is provided a lens comprising opposed first and second reflectors. The first reflector is configured to at least partially transmit a light beam through the first reflector to impinge onto the second reflector. The second reflector is configured to at least partially reflect the light beam propagated through the first reflector back to the first reflector. The first reflector is further configured to at least partially reflect the light beam reflected by the second reflector back to the second reflector. The second reflector is further configured to at least partially transmit the light beam reflected by the first reflector. At least one of the first or second reflectors are made deformable by application of a control signal for tuning optical power, i.e. focusing or defocusing power, of the lens.

In some embodiments, the first reflector comprises a partially reflective mirror, e.g. a 50/50 mirror. In embodiments where the second reflector includes a reflective polarizer, the lens may further include a quarter-wave plate between the first and second reflectors for converting a polarization state of the light beam from a first polarization state to a second, orthogonal polarization state upon a double pass propagation of the light beam through the quarter-wave plate. The reflective polarizer may be e.g. a linear reflective polarizer.

In some embodiments, at least one of the first or second reflectors comprises a flexible membrane, which may be deformable by application of radial force to a perimeter of the flexible membrane. In embodiments where the lens includes a supporting ring disposed concentrically in contact with the flexible membrane, the supporting ring having a diameter less than a diameter of the flexible membrane, the flexible membrane may be deformed by application of a force component to a perimeter of the flexible membrane to press the flexible membrane against the supporting ring, such that the force component is parallel to an optical axis of the lens.

In embodiments where the flexible membrane comprises a layer of electroactive material, the at least one of the first or second reflectors may further include a transparent electrode layer and a conductive reflective layer, and the layer of electroactive material may be disposed between the transparent electrode layer and the conductive reflective layer.

In some embodiments, both the first and second reflectors are deformable by application of control signals for tuning the optical power of the lens. At least one refractive lens element may be disposed between the first and second reflectors.

In accordance with the present disclosure, there is provided a near-eye display (NED) comprising a display panel for providing an image in linear domain, and a tunable ocular lens for converting the image in linear domain into an image in angular domain at an eyebox of the NED, the tunable ocular lens including any of the tunable lenses disclosed herein. In embodiments where the first reflector comprises a partially reflective mirror and the second reflector comprises a linear reflective polarizer, the tunable ocular lens may further include a quarter-wave plate between the first and second reflectors for converting a polarization state of the light beam from a first polarization state to a second, orthogonal polarization state upon a double pass propagation of the light beam through the quarter-wave plate.

In embodiments where the at least one of the first or second reflectors comprises a flexible membrane, the flexible membrane may be deformable by: application of radial force to a perimeter of the flexible membrane, and/or by application of a force component to a perimeter of the flexible membrane to press the flexible membrane against the supporting ring mentioned above, such that the force component is parallel to an optical axis of the tunable ocular lens.

In some embodiments, the at least one of the first or second reflectors includes a flexible membrane comprising, in a stack configuration: a transparent electrode layer; a layer of electroactive material; and a conductive reflective layer. The layer of electroactive material may be disposed between the transparent electrode layer and the conductive reflective layer.

In accordance with the present disclosure, there is further provided a pancake lens. The pancake lens includes a partial reflector, a linear reflective polarizer, and a quarter-wave plate in an optical path between the partial reflector and a linear reflective polarizer. At least one of the partial reflector or linear reflective polarizer may be curved. At least one of the partial reflector or linear reflective polarizer may include a flexible membrane deformable by application of a control signal for tuning optical power of the pancake lens. The flexible membrane may be deformable by: application of radial force to a perimeter of the flexible membrane; and/or application of a force component to a perimeter of the flexible membrane to press the flexible membrane against the supporting ring mentioned above; the force component is parallel to an optical axis of the pancake lens.

The flexible membrane may include, in a stack configuration, a transparent electrode layer; a layer of electroactive material; and a conductive reflective layer. The layer of electroactive material may be disposed between the transparent electrode layer and the conductive reflective layer.

Referring now to FIG. 1A, a lens 100 includes opposed first 111 and second 112 reflectors with optional first 101 and second 102 refractive lens elements disposed in series between the first 111 and second 112 reflectors. The lens 100 may function as a tunable ocular lens for viewing an image in linear domain displayed by a miniature display panel 106 at a short distance, by converting the image in linear domain into an image in angular domain at an eye pupil 110. Herein and throughout the rest of the specification, the term "image in linear domain" denotes an image where individual pixels of the image are represented by pixel linear coordinates, i.e. row and column numbers of the display panel, and the term "image in angular domain" refers to an image where individual pixels of the image are represented by an angle of a collimated optical beam at the eye pupil 110.

The first reflector 111 is configured to at least partially transmit a light beam 104 through the first reflector 111 to impinge onto the second reflector 112. The second reflector 112 is configured to at least partially reflect the light beam 104 propagated through the first reflector 111 back to the first reflector 111. The first reflector 111 is further configured to at least partially reflect the light beam 104 reflected by the second reflector 112 back to the second reflector 112. The second reflector 112 is further configured to at least partially transmit the light beam 104 reflected by the first reflector 111, to the eye pupil 110.

The lens 100 has optical power due to presence of elements having optical power. For instance, the first reflector 111 may be curved as shown in FIG. 1A. The optional first 101 and second 102 refractive lens elements may also provide optical power for the lens 100. The curvature of individual optical elements may be selected so as to offset or reduce overall optical aberrations. At least one or both of the first 111 or second 112 reflectors are deformable by application of control signal(s) in form of an electrical signal, mechanical pressure or force, etc., fur tuning the lens 100, i.e. changing its optical power in a controllable manner.

Specific exemplary configurations of the first 111 and second 112 reflectors will now be considered. The first reflector 111 may be a partially reflective mirror such as, for example, a 50/50 mirror which reflects the same amount of light as it transmits; that is, the optical energy per unit time of the transmitted and reflected light is the same. The second reflector 112 may be a reflective polarizer, e.g. a linear reflective polarizer. The lens 100 may further include a quarter-wave plate (QWP) 108 disposed between the first 111 and second 112 reflectors for converting a polarization state of the light beam 104 from a first polarization state to a second, orthogonal polarization state upon a double pass propagation of the light beam through the QWP 108. In FIG. 1A, the QWP 108 is shown laminated onto the first refractive lens element 101 as a non-limiting example.

Figure 1B:
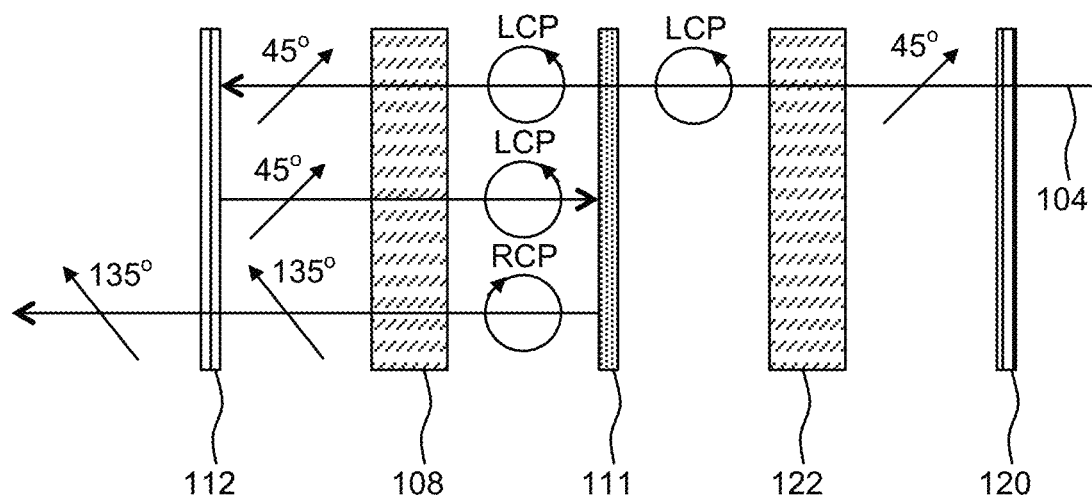
FIG. 1B is a polarization diagram of the tunable lens of FIG. 1A.

FIG. 1B provides an illustration of folding the optical path of the light beam 104 using a reflective polarizer, a QWP, and a partial reflector. The display panel 106 may include a linear transmission polarizer 120 coupled to a display-side QWP 122. The light beam 104 emitted by the display panel 106 is left-circular polarized (LCP) upon propagating through the display-side QWP 122.

The LCP light beam 104 propagates through the first reflector 111, i.e. the 50/50 reflector in this embodiment, and impinges onto the QWP 108, which converts the polarization state to a linear polarized state at 45 degrees. The second reflector 112, i.e. the linear reflective polaier in this embodiment, is configured to reflect the 45 degrees linearly polarized light, so the light beam 104 is reflected from the second reflector 112 to propagate back through the QWP 108, which converts the polarization state back to LCP. Upon reflection from the first reflector 111, the LCP light beam 104 becomes right circular polarized (RCP) because the direction of propatation of the light beam 104 changes. The RCP light beam 104 propagates through the QWP 108, becomes linearly polarized at 135 degrees, and is transmitted by the reflcetive polarizer to the eye pupil 110. It is to be noted that the polarization states and angles of linear polarization are only meant as an example, and other configurations for folding a light beam path by polarization are possible.

The lens 100 is an embodiment of a pancake lens usable as an ocular lens of a near-eye display. The polarization beam folding of the pancake lens enables a very compact overall NED configuration. Such pancake lens includes a partial reflector (the first reflector 111); a linear reflective polarizer (the second reflector 112); and a quarter-wave plate (the QWP 108) in an optical path between the partial reflector and a linear reflective polarizer. At least one of the partial reflector or linear reflective polarizer may be curved to provide optical power for the pancake lens; and at least one of the partial reflector or linear reflective polarizer may include a flexible membrane deformable by application of a control signal for tuning optical power of the pancake lens.

Figure 1C:
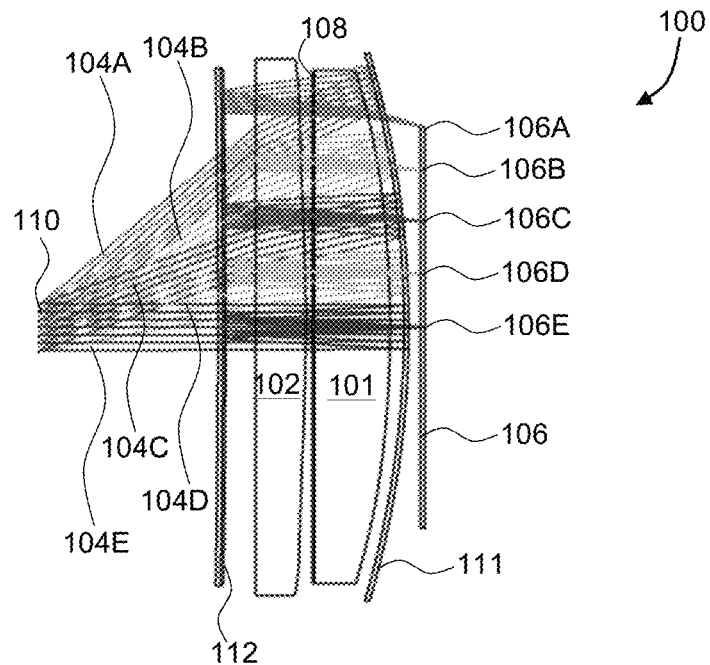
FIG. 1C is a ray-traced view of the tunable lens of FIG. 1A, with a non-curved deformable reflective polarizer.

FIG. 1C illustrates the "offset-to-angle" function of the lens 100. A coordinate of pixels 106A to 106E of the display panel 106 is converted into an angle of incidence of image light beams 104A to 104E emitted by the corresponding pixels 106A to 106E onto the viewer's eye pupil 110, converting an image in linear domain displayed by the display panel 106 into an image in angular domain at the viewer's eye pupil 110.

Figure 1D:
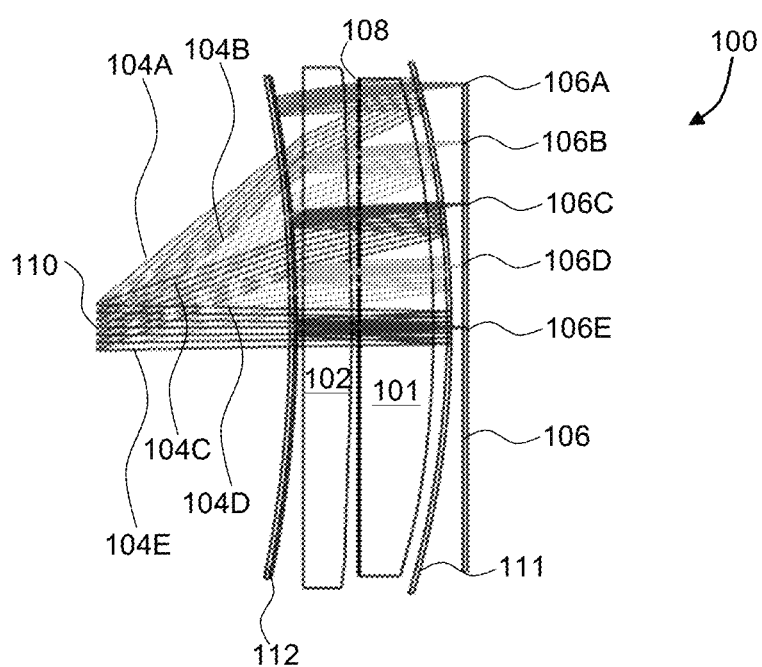
FIG. 1D is a ray-traced view of the tunable lens of FIG. 1A, with the curved deformable reflective polarizer.

Turning to FIG. 1D for comparison with FIG. 1C, the first reflector 111 may include a frexible membrane supporting the reflective polarizer. In FIG. 1C, the flexible membrane is curved, causing the focal length of the lens 100 to increase. This is evidenced by the pixels 106A to 106E being spaced farther away in FIG. 1D as compared to FIG. 1C, at similar output angles of the image light beams 104A to 104E. In FIGS. 1C and 1D, the image light beams 104A to 104E were traced from the viewer's eye pupil 110 back to the display panel 106, for convenience of illustration. At least one of the first 111 or second 112 reflectors may include a flexible membrane that may change its radius of curvature and associated optical power by application of an external signal.

Figure 2A:
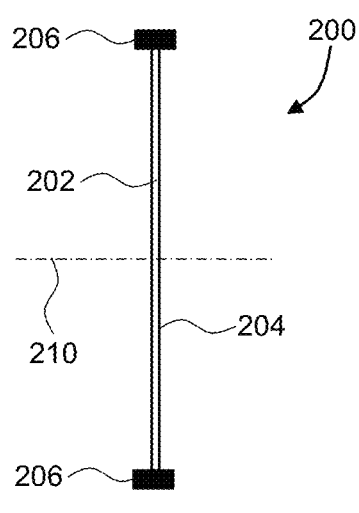
FIG. 2A is a side cross-sectional view of a deformable reflector in a non-deformed state, according to an embodiment.
Figure 2B:
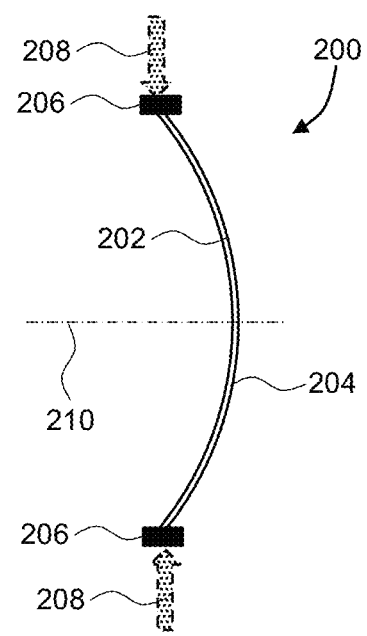
FIG. 2B is a side cross-sectional view of the deformable reflector of FIG. 2A deformed by application of a radial pressure.

Several non-limiting examples of a deformable reflector based on a flexible membrane will now be considered. Referring first to FIG. 2A, a deformable reflector 200 includes a flexible membrane 202 supporting a reflective layer 204 such as a partial reflector or a reflective polarizer. The flexible membrane 202 can be mounted in a ring 206. When a radial force is applied to the ring 206 as illustrated in FIG. 2B with arrows 208, i.e. perpendicularly to an optical axis 210 of the deformable reflector 200, the flexible membrane 202 changes its shape from nearly flat to a curved shape. Astigmatism of the reflective layer 204 may be introduced by providing a non-uniform radial squeezing force 208 to the perimeter of the flexible membrane 202. The flexible membrane 202 may be slightly pre-curved in the initial state to break the symmetry and define the direction in which the flexible membrane 202 will be curved upon application of the radial force 208.

Figures 3A, 3B:
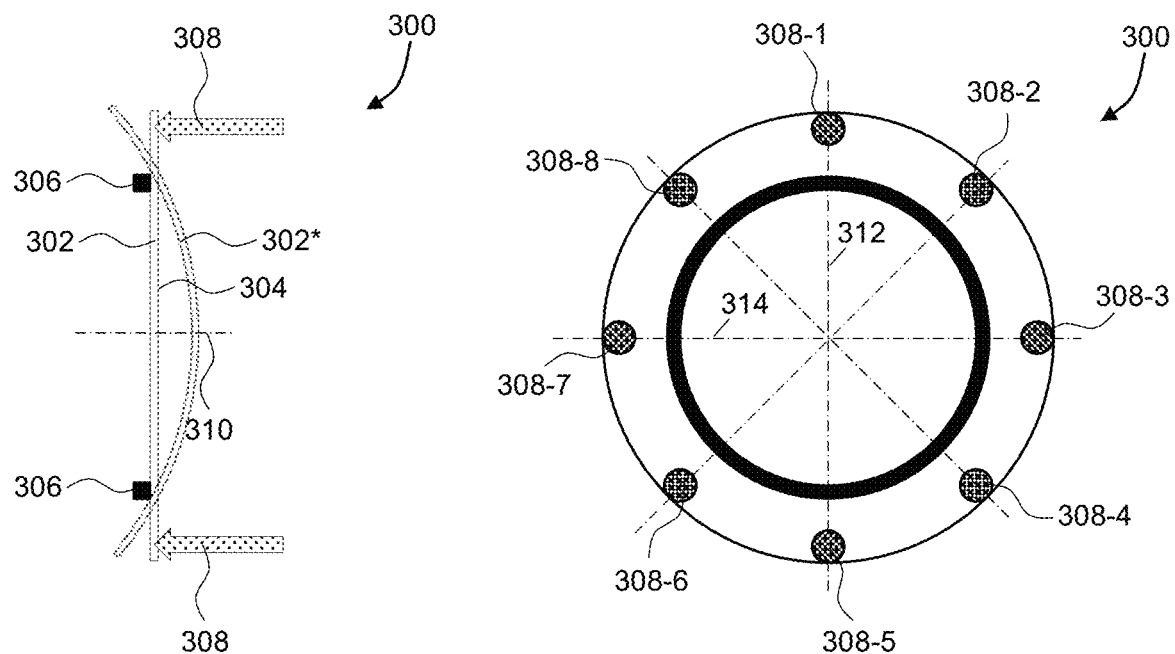
FIG. 3A is a side cross-sectional view of a deformable reflector in a non-deformed state, according to an embodiment.
FIG. 3B is a side cross-sectional view of the deformable reflector of FIG. 3A deformed by application of pressure parallel to the optical axis.

Turning to FIG. 3A, a deformable reflector 300 is an embodiment of the first 111 and/or second 112 reflectors of the lens 100 of FIGS. 1A-1D. The deformable reflector 300 of FIG. 3 includes a flexible membrane 302 supporting a reflective layer 304, e.g. a partial reflector or a reflective polarizer. A supporting ring 306 is disposed concentrically in contact with the flexible membrane 302. The supporting ring 306 has a diameter less than a diameter of the flexible membrane 302. The flexible membrane 302 is deformable by application of a force component indicated with arrows 308 to a perimeter of the flexible membrane 302 to press the flexible membrane 302 against the supporting ring 306. The force component in the direction of the arrows 308 is parallel to an optical axis 310 of the tunable lens 300, causing the flexible membrane 302 to bend as indicated with dashed lines 302*.

In FIG. 3B, the deformable reflector 300 is shown in a plan view. Strength of force components 308-1 to 308-8 may be varied to cause the deformable membrane 302 and the reflective layer 304 adopt a non-symmetrical shape for compensating various eye imperfections as defined by an eye lens prescription, such as astigmatism for example. The application of force components 308-1 and 308-5 may cause a nearly-cylindrical lens formation with optical power (i.e. focusing-defocusing power) in a vertical plane 312, the application of force components 308-3 and 308-7 may cause a nearly-cylindrical lens formation with optical power in a horizontal plane 314, and so on.

Figure 4:
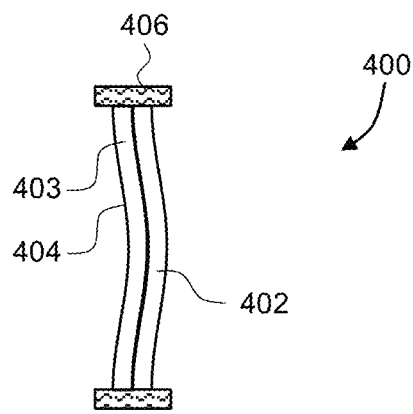
FIG. 4 is a side cross-sectional view of the deformable reflector having a layer of electroactive material.

Referring to FIG. 4, a deformable reflector 400 is an embodiment of the first 111 and/or second 112 reflectors of the lens 100 of FIGS. 1A-1D. The deformable reflector 400 of FIG. 4 includes a layer of electroactive material 402 such as, for example, a polyvinylidene fluoride (PVDF), which may be supported by a backing layer 403 bonded to the layer of electroactive material 402. A reflective layer 404 may be supported by the backing layer 404. Suitable backing layer material include polymer, such as polymethylmethacrylate, polycarbonate, or cyclic polyolefin, glass, ceramics such as sapphire, and combinations thereof. Young's modulus of the backing layer 403 may be greater than Young's modulus of the layer of electroactive material 402, to provide a greater elastic force of the deformable reflector 400. An annular spring 406 may support the deformable reflector 400 around a perimeter of the deformable reflector 400. The annular spring 406 may have a spatially variant stiffness around the perimeter of the deformable reflector 400. The predetermined stiffness may be provided e.g. by varying the modulus of the spring material, the shape of the spring 406, or a combination of the two.

Figure 5A:
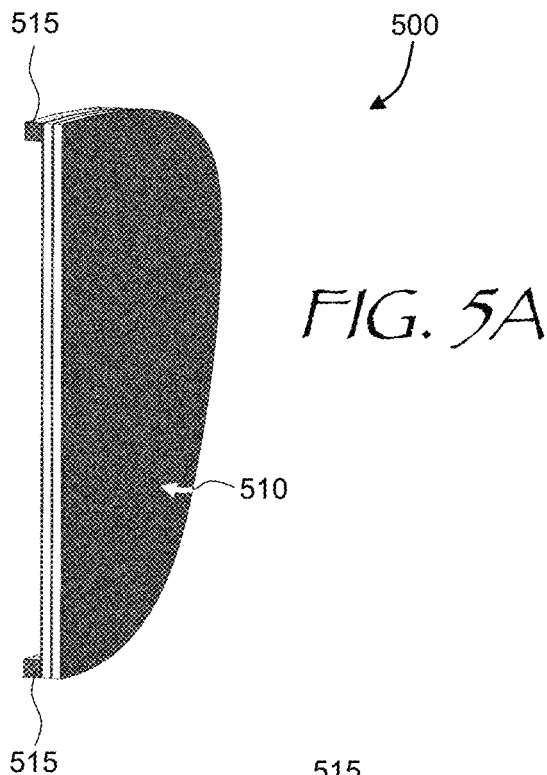
FIG. 5A is a three-dimensional cutout view of a deformable reflector having two electroactive layers.
Figure 5B:
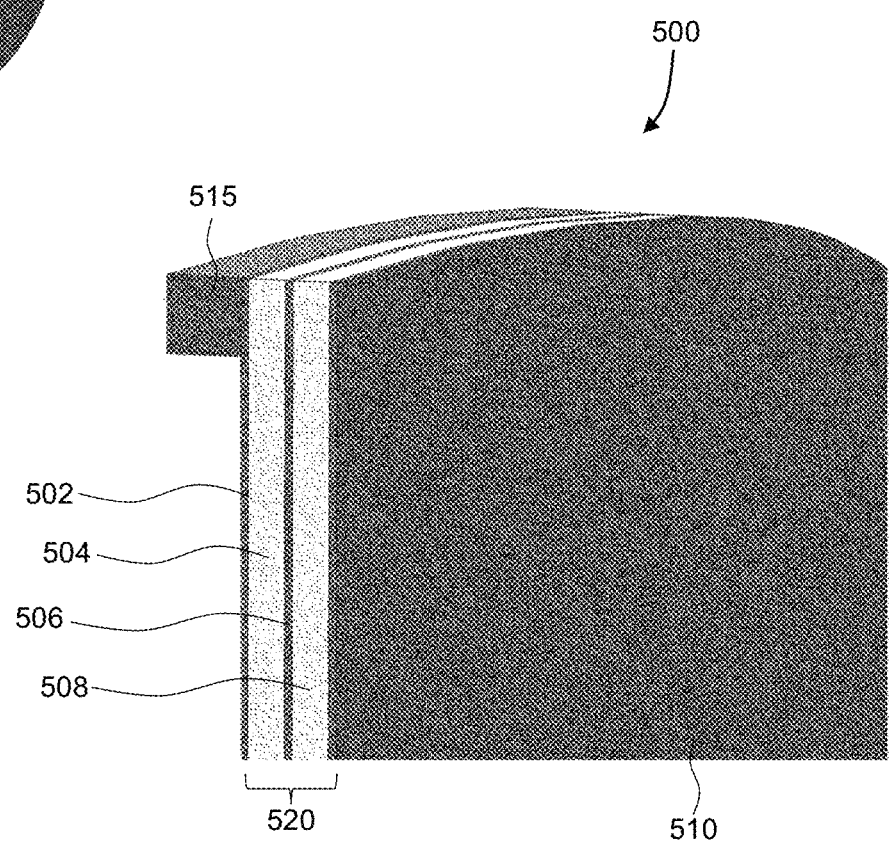
FIG. 5B is a magnified view of FIG. 5A.

Referring to FIGS. 5A and 5B, a deformable reflector 500 is an embodiment of the first 111 and/or second 112 reflectors of the lens 100 of FIGS. 1A-1D. The deformable reflector 500 of FIGS. 5A and 5B includes a flexible membrane 520 mounted on a ring 515. The flexible membrane 520 includes a stack of the following layers (FIG. 5B): a first electrode layer 502, a first material 504, a second electrode layer 506, a second material 508, and a reflective electrode layer 510 that combines the functions of an electrode and a flexible reflector. When an electric field is applied to the first 504 and/or second 508 materials by means of the first 502, second 506, and reflective 510 electrode layers, the flexible membrane 520 deforms, causing the optical power (i.e. the focusing or defocusing power) of the reflective electrode layer 510 to vary. At least one a transparent electrode layer and conductive reflective layer may be provided, with the layer of electroactive material disposed between the transparent electrode layer and the conductive reflective layer.

The first material 504 may be e.g. a piezoelectric material or an electrostrictive polymer. The first 502 and second 506 electrode layers may be, without limitation, a transparent conductive oxide such as indium tin oxide (ITO) or indium gallium zinc oxide (IGZO), or a nanowire electrode, graphene or carbon nanotube electrodes, metal electrodes, including aluminum or silver, or multilayer optical stacks of, for example, ITO and silver thin films. The electrostrictive material may be acrylate elastomer, silicone, PVDF-TrFE-CTF, and the like. Piezoelectric materials may be PVDF, PVDF-TrFE polymers, or ceramics such as PMN-PT, PZT, LiNbO$_3$ and the like. For unimorph membranes, either of the first 504 or second 508 materials may be a passive material such as polymer, glass, or ceramic, or a combination thereof. The stiffness of the ring 515 may be spatially variant.

Figure 6:
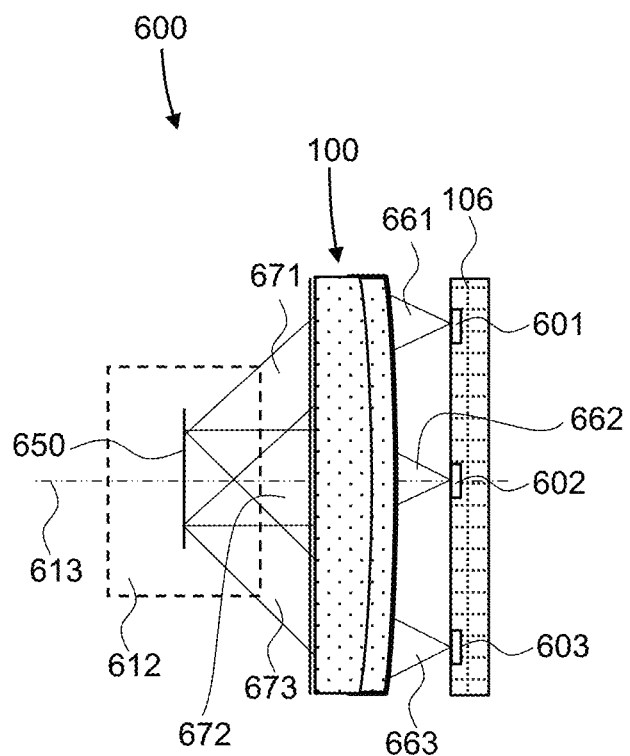
FIG. 6 is a schematic view of a near-eye display including the tunable lens of FIGS. 1A-1D used as an ocular lens of the near-eye display.

Turning to FIG. 6, a near-eye display (NED) 600 may include any of the tunable lenses disclosed herein. The NED 600 includes the display panel 106 coupled to the lens 100 of FIGS. 1A-1D or any variant of the lens 100 considered herein. The display panel 106 is configured to provide an image in linear domain, that is, an image where individual pixels of the image are represented by row and column numbers of individual pixels of the display panel 106. Three such display panel pixels are shown in FIG. 6, a first pixel 601, a second pixel 602, and a third pixel 603. The second pixel 602 is an on-axis pixel, i.e. the second pixel 602 is disposed on the optical axis 613 of the lens 100, while the first 601 and third 603 pixels are off-axis pixels disposed away from the optical axis 613.

The lens 100 is configured to convert the image in linear domain into an image in angular domain at an eyebox 612 of the NED 600 for direct observation by a user's eye, not shown, at the eyebox 612. The term "image in angular domain" refers to an image where individual pixels of the image are represented by an angle of a collimated optical beam at the eyebox 612. For example, the first pixel 601 emits a first diverging cone of light 661 that is collimated by the lens 100 into a first collimated light beam 671 having an oblique angle of incidence at an exit pupil 650 of the NED 600 disposed in the eyebox 612. The second pixel 602 emits a second diverging cone of light 662 that is collimated by the lens 100 into a second collimated light beam 672 having a zero (or normal) angle of incidence at the exit pupil 650. Finally, the third pixel 603 emits a third diverging cone of light 663 that is collimated by the lens 100 into a third collimated light beam 673 having an oblique angle of incidence at the exit pupil 650, of an opposite sign as the first collimated light beam 671. In other words, the lens 100 operates as an offset-to-angle element converting an offset of a diverging beam of light upstream of the lens 100 into an angle of a collimated beam of light downstream of the lens 100.

Figure 7:
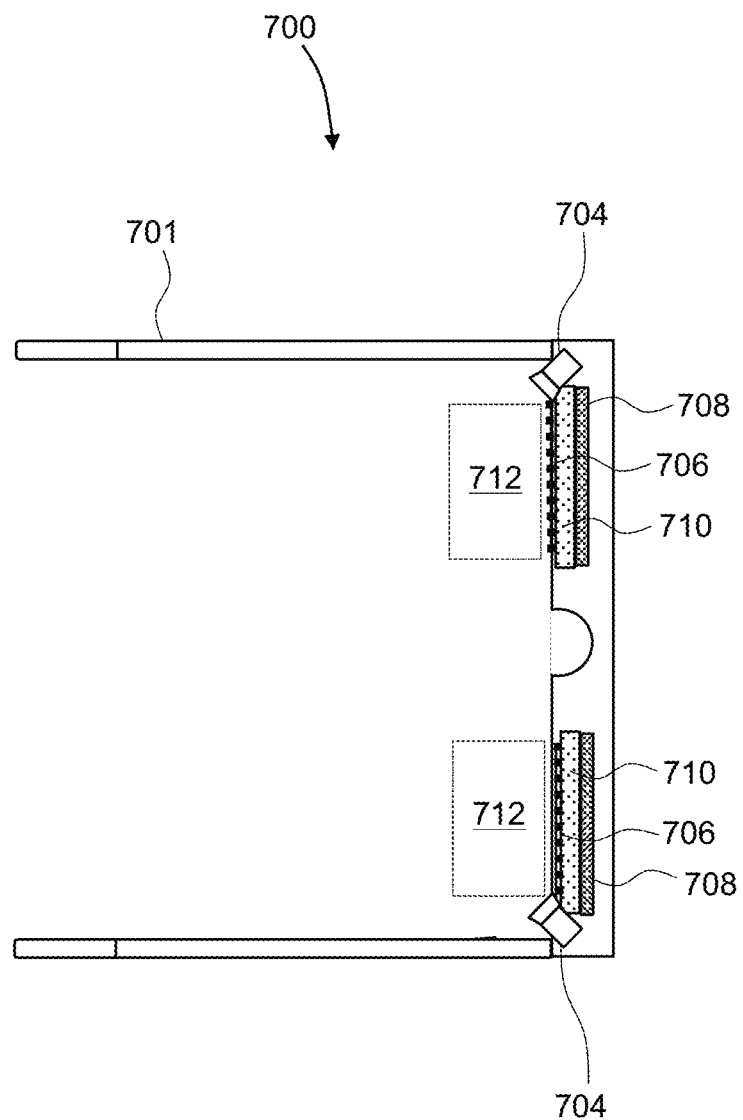
FIG. 7 is a top view of a near-eye display of this disclosure having a form factor of a pair of eyeglasses.

Referring to FIG. 7, a near-eye display 700 includes a frame 701 having a form factor of a pair of eyeglasses. The frame 701 supports, for each eye: an electronic display panel 708, an ocular lens 710 optically coupled to the electronic display panel 708, an eye-tracking camera 704, and a plurality of illuminators 706. The ocular lens 710 may include any of the tunable lenses disclosed herein. The illuminators 706 may be supported by the ocular lens 710 for illuminating an eyebox 712. The electronic display panel 708 provides an image in linear domain that is converted by the ocular lens 710 into an image in angular domain for observation by a user's eye.

The purpose of the eye-tracking cameras 704 is to determine position and/or orientation of both eyes of the user. Once the position and orientation of the user's eyes are known, a gaze convergence distance and direction may be determined. The imagery displayed by the display panels 708 may be adjusted dynamically to account for the user's gaze, for a better fidelity of immersion of the user into the displayed augmented reality scenery, and/or to provide specific functions of interaction with the augmented reality. The focal length of the ocular lenses 710 may be tuned to lessen vergence-accommodation conflict, reducing tiredness and headache of a user of the near-eye display 700. In operation, the illuminators 706 illuminate the eyes at the corresponding eyeboxes 712, to enable the eye-tracking cameras 704 to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with illuminating light, the latter may be made invisible to the user. For example, infrared light may be used to illuminate the eyeboxes 712.

Figure 8:
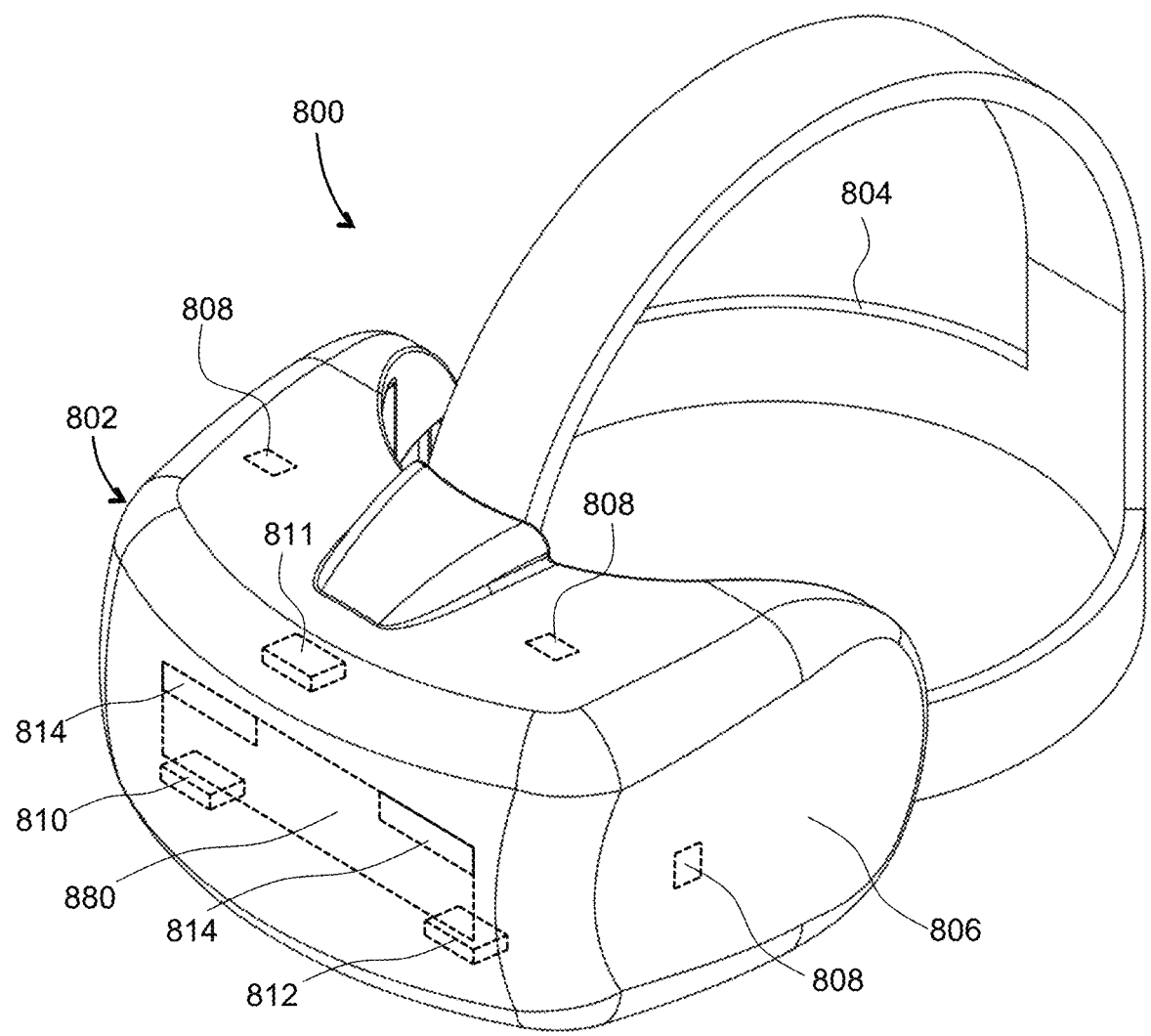
FIG. 8 is a three-dimensional view of a head-mounted display of this disclosure.

Turning to FIG. 8, an HMD 800 is an example of an AR/VR wearable display system which encloses the user's face, for a greater degree of immersion into the AR/VR environment. The function of the HMD 800 may be to generate the entirely virtual 3D imagery. The HMD 800 may include a front body 802 and a band 804. The front body 802 is configured for placement in front of eyes of a user in a reliable and comfortable manner, and the band 804 may be stretched to secure the front body 802 on the user's head. A display system 880 may be disposed in the front body 802 for presenting AR/VR imagery to the user. The display system 880 may include any of the tunable lenses disclosed herein. Sides 806 of the front body 802 may be opaque or transparent.

In some embodiments, the front body 802 includes locators 808 and an inertial measurement unit (IMU) 810 for tracking acceleration of the HMD 800, and position sensors 812 for tracking position of the HMD 800. The IMU 810 is an electronic device that generates data indicating a position of the HMD 800 based on measurement signals received from one or more of position sensors 812, which generate one or more measurement signals in response to motion of the HMD 800. Examples of position sensors 812 include: one or more accelerometers, one or more gyroscopes, one or more magnetometers, another suitable type of sensor that detects motion, a type of sensor used for error correction of the IMU 810, or some combination thereof. The position sensors 812 may be located external to the IMU 810, internal to the IMU 810, or some combination thereof.

The locators 808 are traced by an external imaging device of a virtual reality system, such that the virtual reality system can track the location and orientation of the entire HMD 800. Information generated by the IMU 810 and the position sensors 812 may be compared with the position and orientation obtained by tracking the locators 808, for improved tracking accuracy of position and orientation of the HMD 800. Accurate position and orientation is important for presenting appropriate virtual scenery to the user as the latter moves and turns in 3D space.

The HMD 800 may further include a depth camera assembly (DCA) 811, which captures data describing depth information of a local area surrounding some or all of the HMD 800. The depth information may be compared with the information from the IMU 810, for better accuracy of determination of position and orientation of the HMD 800 in 3D space.

The HMD 800 may further include an eye tracking system 814 for determining orientation and position of user's eyes in real time. The obtained position and orientation of the eyes also allows the HMD 800 to determine the gaze direction of the user and to adjust the image generated by the display system 880 accordingly. In one embodiment, the vergence, that is, the convergence angle of the user's eyes gaze, is determined. The determined gaze direction and vergence angle may be used to adjust focal length of lenses of the display system 880 to reduce the vergence-accommodation conflict. The direction and vergence may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 802.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A lens comprising:
   opposed first and second reflectors;
   wherein the first reflector is configured to at least partially transmit a light beam therethrough to impinge onto the second reflector;
   wherein the second reflector is configured to at least partially reflect the light beam propagated through the first reflector back to the first reflector;
   wherein the first reflector is further configured to at least partially reflect the light beam reflected by the second reflector back to the second reflector;
   wherein the second reflector is further configured to at least partially transmit the light beam reflected by the first reflector;
   wherein at least one of the first or second reflectors is deformable by application of a control signal for tuning optical power of the lens; and
   wherein the at least one of the first or second reflectors further comprises a flexible membrane that includes a layer of electroactive material disposed between a transparent electrode layer and a conductive reflective layer.

2. The lens of claim 1, wherein the first reflector comprises a partially reflective mirror.

3. The lens of claim 2, wherein the partially reflective mirror is a 50/50 mirror that reflects a same amount of light as it transmits.

4. The lens of claim 2, wherein the second reflector comprises a reflective polarizer, the lens further comprising a quarter-wave plate between the first and second reflectors for converting a polarization state of the light beam from a first polarization state to a second, orthogonal polarization state upon a double pass propagation of the light beam through the quarter-wave plate.

5. The lens of claim 4, wherein the reflective polarizer is a linear reflective polarizer.

6. The lens of claim 1, wherein the flexible membrane is deformable by application of radial force to a perimeter of the flexible membrane.

7. The lens of claim 1, further comprising a supporting ring disposed concentrically in contact with the flexible membrane, the supporting ring having a diameter less than a diameter of the flexible membrane, wherein the flexible membrane is deformable by application of a force component to a perimeter of the flexible membrane to press the flexible membrane against the supporting ring, wherein the force component is parallel to an optical axis of the lens.

8. The lens of claim 1, wherein both the first and second reflectors are deformable by application of control signals for tuning the optical power of the lens.

9. The lens of claim 1, further comprising a first refractive lens element between the first and second reflectors.

10. The lens of claim 9, further comprising a second refractive lens element between the first and second reflectors serially coupled to the first refractive lens element.

11. The lens of claim 1, wherein the layer of electroactive material is supported by a backing layer having a first Young's modulus that is greater than a second Young's modulus of the layer of electroactive material.

12. The lens of claim 11, wherein the backing layer is bonded to the layer of electroactive material.

13. A near-eye display (NED) comprising:
a display panel for providing an image in linear domain; and
a tunable ocular lens for converting the image in linear domain into an image in angular domain at an eyebox of the NED, the tunable ocular lens comprising opposed first and second reflectors;
wherein the first reflector is configured to at least partially transmit a light beam therethrough to impinge onto the second reflector;
wherein the second reflector is configured to at least partially reflect the light beam propagated through the first reflector back to the first reflector;
wherein the first reflector is further configured to at least partially reflect the light beam reflected by the second reflector back to the second reflector;
wherein the second reflector is further configured to at least partially transmit the light beam reflected by the first reflector;
wherein at least one of the first or second reflectors is deformable by application of a control signal for tuning the tunable ocular lens; and
wherein the at least one of the first or second reflectors comprises a flexible membrane comprising, in a stack configuration:
a transparent electrode layer;
a layer of electroactive material; and
a conductive reflective layer;
wherein the layer of electroactive material is disposed between the transparent electrode layer and the conductive reflective layer.

14. The NED of claim 13, wherein the first reflector comprises a partially reflective mirror, and wherein the second reflector comprises a linear reflective polarizer, the tunable ocular lens further comprising a quarter-wave plate between the first and second reflectors for converting a polarization state of the light beam from a first polarization state to a second, orthogonal polarization state upon a double pass propagation of the light beam through the quarter-wave plate.

15. The NED of claim 13, wherein at least one of:
the flexible membrane is deformable by application of radial force to a perimeter of the flexible membrane; or
the tunable ocular lens further comprises a supporting ring disposed concentrically in contact with the flexible membrane, the supporting ring having a diameter less than a diameter of the flexible membrane, wherein the flexible membrane is deformable by application of a force component to a perimeter of the flexible membrane to press the flexible membrane against the supporting ring, wherein the force component is parallel to an optical axis of the tunable ocular lens.

16. The NED of claim 13, wherein the layer of electroactive material is supported by a backing layer having a first Young's modulus that is greater than a second Young's modulus of the layer of electroactive material.

17. The NED of claim 16, wherein the backing layer is bonded to the layer of electroactive material.

18. A pancake lens comprising:
a partial reflector;
a linear reflective polarizer; and
a quarter-wave plate in an optical path between the partial reflector and a linear reflective polarizer;
wherein at least one of the partial reflector or linear reflective polarizer is curved; and
wherein at least one of the partial reflector or linear reflective polarizer comprises a flexible membrane deformable by application of a control signal for tuning optical power of the pancake lens and the flexible membrane comprises, in a stack configuration:
a transparent electrode layer;
a layer of electroactive material; and
a conductive reflective layer;
wherein the layer of electroactive material is disposed between the transparent electrode layer and the conductive reflective layer.

19. The pancake lens of claim 18, wherein at least one of:
the flexible membrane is deformable by application of radial force to a perimeter of the flexible membrane; or
the pancake lens further comprises a supporting ring disposed concentrically in contact with the flexible membrane, the supporting ring having a diameter less than a diameter of the flexible membrane, wherein the flexible membrane is deformable by application of a force component to a perimeter of the flexible membrane to press the flexible membrane against the supporting ring, wherein the force component is parallel to an optical axis of the pancake lens.

20. The pancake lens of claim 18, wherein the layer of electroactive material is supported by a backing layer having a first Young's modulus that is greater than a second Young's modulus of the layer of electroactive material.

* * * * *